United States Patent [19]

Wingler et al.

[11] 3,879,357
[45] Apr. 22, 1975

[54] PULVERIZABLE ACRYLIC RESINS

[75] Inventors: Frank Wingler, Leverkusen; Richard Müller, Bergisch Neukirchen; Gerd Wassmuth, Leverkusen; Rudolf Erdmenger, Bergisch Gladbach; Martin Ullrich, Leverkusen, all of Germany

[73] Assignee: Bayer Aktiengesellschaft, Leverkusen, Germany

[22] Filed: Jan. 28, 1974

[21] Appl. No.: 437,210

[30] Foreign Application Priority Data

Feb. 1, 1973 Germany............................ 2304847

[52] U.S. Cl.......... 206/80.8; 260/42.52; 260/80.3 R; 260/80.72; 260/80.73; 260/80.75; 260/86.1 R; 260/86.1 E; 260/86.7; 260/88.1 PC; 117/123 D; 117/132 B; 117/138.8 UA; 117/148
[51] Int. Cl. ..... C08f 1/04; C08f 15/02; C08f 15/40
[58] Field of Search....................... 260/80.8, 86.1 R

[56] References Cited
UNITED STATES PATENTS
3,753,958   8/1973   Wingler et al. ............... 260/78.5 R Primary Examiner—Stanford M. Levin
Attorney, Agent, or Firm—Connolly and Hutz

[57] ABSTRACT

Copolymer having an average molecular weight of 500 to 10,000, a glass transition temperature of 40° to 70°C and an acid number of 55 to 120 mg of KOH/g of copolymer, said copolymer being the product of free radical copolymerization of a monomer mixture of I. 0 to 55 mol % of styrene, α-methylstyrene, methylmethacrylate or mixtures thereof;
II. 10 to 25 mol % of acrylic acid, methacrylic acid or mixtures thereof;
III. 0 to 70 mol % of at least one ester of methacrylic acid containing 2 to 18 carbon atoms in the alcohol component and
IV. 20 to 50 mol % of at least one ester of acrylic acid containing 1 to 18 carbon atoms in the alcohol component, and process of producing said copolymer by continuously polymerizing said monomer mixture in a continuously fed process under steady state and perfectly agitated conditions to a conversion of 35 to 60 mol % and then polymerizing resulting polymerization reaction mixture to a conversion of at least 94 mol % under non-steady state conditions which prevent back mixing of the polymer produced in said second polymerization step with polymerization reaction mixture from said first polymerization reaction step in a tubular plug flow reactor under non-steady state conditions.

9 Claims, No Drawings

PULVERIZABLE ACRYLIC RESINS

This invention relates to a process for the continuous for semicontinuous solvent-free production of copolymers of styrene, methacrylic and/or acrylic acids and acrylic and methacrylic acid esters.

It is known that pulverizable acrylic resins produced mainly from styrene and acrylate or methacrylate esters can be used for powder coating processes and in particular for electrostatic powder spraying processes. Resins which contain acrylic or methacrylic acid in a copolymerized form as reactive groups are particularly important in practice. The acid resins can be cross-linked with bisoxazolines, bis-oxazines or polyepoxides. Coatings based on these substrates are distinguished by their high surface gloss and hardness which they preserve even after many years' exposure to weather. These binders have advantageous stoving properties; they can be stoved at 160°C in about 30 minutes if the acid number is between 55 and 120 mg of KOH per g of substance (see F. Wingler et al., Farbe and Lack, 11, 1063 (1972)) but their flowing qualities are poor and cannot be compared with those of conventional wet coated lacquers even after the addition of levelling agents. The conventional pulverulent binders result in a wavy surface after stoving and tend to give rise to an orange peel effect. They are produced by solvent-free polymerization, solution polymerization or suspension polymerization.

It is a known fact in macromolecular chemistry that monomers from different groups of substances polymerize at different velocities. Certain monomers are more rapidly incorporated in the polymer than are less reactive monomers. In the course of polymerization, therefore, the monomer mixture becomes depleted of the more highly reactive monomers which are preferentially incorporated in the polymer at the beginning of polymerization. A shift in monomer concentrations therefore takes place in the course of polymerization and the statistical composition of the polymer therefore varies continuously with time.

Commerical copolymers therefore usually consist of mixtures of various copolymers and can usually be described only by their gross composition, i.e. the average content of the individual monomers in the total polymer. Such polymers are referred to as non-uniform polymers or polymers with a wide range of monomer distribution (chemical distribution). The distribution can be determined by preparative analytical methods of fractional analysis. A more accurate, quantitative description of the distribution can be obtained by means of an equation drawn up by Alfrey and Goldfinger, the correctness of which has already been confirmed in numerous cases.

The Alfrey Goldfinger equation for a terpolymer, for example, is as follows:

$$Q_1 = [M_1]\left(\frac{[M_1]}{r_{31}r_{21}} + \frac{[M_2]}{r_{21}r_{32}} + \frac{[M_3]}{r_{31}r_{23}}\right)\left([M_1] + \frac{[M_2]}{r_{12}} + \frac{[M_3]}{r_{13}}\right)$$

$$Q_2 = [M_2]\left(\frac{[M_1]}{r_{12}r_{31}} + \frac{[M_2]}{r_{12}r_{32}} + \frac{[M_3]}{r_{32}r_{13}}\right)\left([M_2] + \frac{[M_1]}{r_{21}} + \frac{[M_3]}{r_{23}}\right)$$

$$Q_3 = [M_3]\left(\frac{[M_1]}{r_{13}r_{21}} + \frac{[M_2]}{r_{23}r_{12}} + \frac{[M_3]}{r_{13}r_{23}}\right)\left([M_3] + \frac{[M_1]}{r_{31}} + \frac{[M_2]}{r_{32}}\right)$$

where $d[M_1] : d[M_2] : d[M_3] = Q_1 : Q_2 : Q_3$.

The copolymerization parameter $r$ is obtained from the ratios of the growth constants $k$ as follows:

$r_{12} = k_{11}/k_{12}$; $r_{21} = k_{22}/k_{21}$; $r_{31} = k_{33}/k_{31}$
$r_{13} = k_{11}/k_{13}$; $r_{23} = k_{22}/k_{23}$; $r_{32} = k_{33}/k_{32}$

M is the monomer concentration in any given case (mol/litre).

(See T. Alfrey and G. Goldfinger, J. chem. Phys. 12, 322 (1944); T. Alfrey, F. R. Mayo and F. T. Wall, J. Polymer Sci. 1, 581 (1946); T. Alfrey, J. J. Bohrer, U. H. Mark, Copolymerisation, Interscience, New York, London 1952, page 126; R. J. Slocombe, Journal of Polymer Sci. 26, 9 (1957); D. Braun, G. Mott, Angew. Makromol. Chem. 18, 183 (1971); T. T. Szabo, E. B. Naumann, R. T. Blanks, Hydrocarbon Processing 45, 215 (1966); A. Ravve, J. T. Khamis and L. X. Mallavarapu, J. Polymer Sci., Part A 3, 1775 (1965); P. Frank and R. v. Mises, Differential gleichungen in der Physik, Viehweg Verlag Braunschweig 1961, Vol. 1, page 290. H. G. Elias, Makromolekuele, Hüthig und Wepf Verlag, Basel, (1972) page 552.

It has always been found in practice that the nature of monomer distribution in the polymer has an important influence on the use properties of the polymer and that for many use properties such as high glass transition temperature, high impact strength, etc. it is advantageous to obtain a copolymer with a uniform or narrow distribution. It was therefore surprising that in the acid acrylic resins mentioned above, improved properties are obtained if a particular non-uniformity or broad distribution which can only be achieved by the measures employed according to the invention is produced in the copolymer. Both the flow improving infuence exerted by a specific non-uniformity and the measures required for producing it in an acrylic acrylic powder resin have previously been unknown.

It was an object of this invention to provide acrylate binders for the electrostatic powder spray process which would have an average molelcular weight of 500 to 10,000, a glass transition temperature of 40°C to 70°C and an acid number of 55 to 120 mg of KOH per g of substance and which compared with acid acrylate binders already known would have a substantially improved flow for the same overall composition and molecular weight distribution.

This problem was solved as follows:

Monomer mixtures of

| | | |
|---|---|---|
| I. | 0 to 55 mol % of | styrene, α-methylstyrene and/or methylmethacrylate; |
| II. | 10 to 25 mol % of | acrylic acid and/or methacrylic acid; |
| III. | 0 to 70 mol % of | at least one ester of methacrylic acid containing 2 to 18 carbon atoms in the alcohol component and |
| IV. | 20 to 50 mol % of | at least one ester of acrylic acid containing 1 to 18 carbon atoms in the alcohol component. | are first polymerized solvent-free in a continuously fed process (1st stage) to a degree of conversion of 35 to 60 mol % under steady state and perfectly agitated conditions, i.e. the concentrations of all the reactants and the compositions of the products formed remain practically constant during the whole time of polymerization in the continuously fed reaction vessel, and the reaction mixture is then polymerized to a degree of conversion of at least 94 mol % in a second stage under conditions which are non-steady in a tubular plug flow reactor and in such a manner that the reaction mixture from the second stage is substantially prevented from back mixture with the residual monomers from the first stage.

Steady state and perfectly agitated conditions (1st stage of the process) may be established, for example, if polymerization is carried out in a perfectly agitated reaction chamber in which ideal mixing conditions prevail and which is continuously fed with fresh monomer mixture and from which the resulting polymer and the mixture of residual monomers are removed at the same rate as the starting monomers are supplied. Ideal mixing means that the time required for the freshly supplied monomers to be mixed with the reaction mixture already in the reaction chamber is not more than 1/10 of the mean residence time of the components in the reaction chamber. Conditions which are non-steady (2nd stage of the process) may be obtained, for example, if either the mixture of polymer and residual monomers from the first stage is continuously polymerized in a plug flow tubular reactor with a narrow residence time spectrum or the mixture of residual monomers and polymer of the first stage is fed batchwise into a dicontinuously operating batch reactor vessel before polymerization is completed to at least 94 mol %.

If the 2nd stage of the process is carried out continuously, the material to be polymerized enters the reaction tube in the form of a plug or in discrete zones. Baffles inside the tube are provided to prevent the reaction mixture from mixing with more freshly supplied reaction mixture. This continuously operating tubular reactor in which back mixing of older with fresher material is substantially prevented should correspond in its mean residence time conditions to a kettle cascade of vessels of equal size consisting of at least six mixing vessels arranged in series.

If the 2nd stage of the process is carried out intermittently in a discontinously fed batch vessel, the reaction kinetics equally provide the necessary conditions for non-steady conditions and consequently result in a polymer of non-uniform composition, but this method is less important for technical and economic reasons. Polymerization under steady state and perfectly agitated conditions (1st stage of process) results in a polymer which is uniform in composition. With non-steady state conditions of polymerization (2nd stage of process) fractions of differing compositions are produced. The resulting polymer therefore consists of a mixture of a uniform polymer and a non-uniform polymer.

In the first stage of polymerization, the more highly reactive monomers are the first to be built into the polymer. The monomer mixture therefore becomes depleted of the more highly reactive monomers such as styrene or methyl methacrylate as the reaction proceeds and becomes enriched in the less reactive monomers suca as butyl acrylate. The result is that towards the end of polymerization, i.e. near the end of the continuously charged reaction tubular reactor polymer fractions containing a high proportion of less reactive monomers are produced.

In a preferred embodiment of this invention, the monomer mixture consists of

| I. | 0 to 55 mols % of | styrene, α-methylstyrene, methyl methacrylate or mixtures thereof; |
| II. | 10 to 25 mols % of | acrylic acid, methacrylic acid or mixtures thereof; |
| III. | 0 to 70 mols % of | at least one ester of methacrylic acid containing 2 to 18 carbon atoms in the alcohol component and |
| IV. | 20 to 50 mols % of | at least one ester of acrylic acid containing 1 to 18 carbon atoms in the alcohol component. |

An especially preferred monomer mixture consists of 40 to 55 mol % of component I, 10.0 to 25 mol % of component II and 25 to 35 mol % of component IV.

As those skilled in the art can appreciate, other monomers than the specifically recited monomers of the foregoing monomer reaction mixtures may be employed. For example, an epoxy component may be introduced by the use of suitable monomers such as glycidyl ester of long chain aliphatic carboxylic acid esters ($C_7$ to $C_{12}$ carboxylic acids), glycidylacrylate, glycidylmethacrylate, further acrylonitrile, methacrylonitrile, vinyl acetate, vinyl propionate, vinyl stearate, acrylamide, methacrylamide, hydroxyalkyl ester of acrylic or methacrylic acid, diacetone acrylamide, p-tert.-butyl styrene, o- or p-chloro styrene etc. Generally such monomers may be employed in an amount of up to about 20 mol %, if desired.

This invention also relates to pulverizable copolymers obtained by the process according to the invention, i.e. pulverizable acrylic resins with a specifically defined non-uniformity for powder coating processes, which copolymers have an average molecular weight of 500 to 10,000, a glass transition temperature of 40° to 70°C and an acid number of 55 to 120 mg of KOH per g thereof and comprise free radical chain copolymers with an overall composition of statistically copolymerised units of

| I. | 0 to 55 mol % of | styrene, α-methylstyrene, methylmethacrylate or mixtures thereof; |
| II. | 10 to 25 mol % of | acrylic acid and/or methacrylic acid; |
| III. | 0 to 70 mol % of | at least one ester of methacrylic acid containing 2 to 18 carbon atoms in the alcohol component and |
| IV. | 20 to 50 mol % of | at least one ester of acrylic acid containing 1 to 18 carbon atoms in the alcohol component. | wherein
a. the copolymer from the first or second stage does not contain any differential components of a fraction with more than 55.0 mol % of monomers from Group I,
b. it contains at least 5 mol % of fractions containing 30 up to 51 mol % of monomers from Group IV and
c. it contains at least 3 mols % of fractions containing 51 to 80 mol % of monomers from Group IV.

The copolymer (gross composition) preferably consists of 40 to 55 mol % of component I, 10 to 25 mol % of component II and 25 to 35 mol % of component IV.

It was surprising that the acid acrylic resins according to the invention have a substantially improved flow compared with copolymers of the same gross composition and same average molecular weight produced by known processes, for example those described in U.S. Pat. No. 3,753,958, and have an improved surface smoothness and greater hardness after the stoving process than the said copolymers.

The nonuniformity of the kind described above which is advantageous for the flow properties of the pulverulent resin is obtained only if the method of preparation described above is employed. The distribution was determined as follows:

The polymerization parameters of the monomers used as starting materials were first determined in known manner (see. H. G. Elias, Macromolekuele, Hüthig & Wepf Verlag, Basle, 1971, page 541). The monomer mixture was divided into binary pairs, for example into the pairs styrene/acrylic acid, styrene/butyl acrylate, butyl acrylate/acrylic acid, styrene/methylmethacrylate, styrene/methacrylic acid, butyl acrylate/methyl methacrylate, butyl acrylate/methacrylic acid, methyl methacrylate/methacrylic acid and methacrylic acid/acrylic acid. From each of these monomer pairs, ten mixtures were prepared with molar ratios varying from 1 : 9 to 9 : 1. Each of these mixtures was polymerized solvent-free to only low molar conversion rates of less than 20 % at a temperature of 140°C with the aid of peroxide initiators in the presence of 1.5 % by weight of tertiary dodecylmercaptan as molecular weight regulator. Samples were continuously removed from the reaction mixture and the polymer contained in each sample was precipitated, reprecipitated and dried to constant weight and its composition then determined analytically. Determination of the polymer composition was carried out by known methods of oxygen analysis, NMR spectroscopy, determination of the acid number and combustion analyses. The various polymer compositions of the binary pairs were then extrapolated to a conversion rate of zero and this value of polymer composition was plotted against the original monomer compositions. The graphs obtained were used in known manner to determine the binary copolymerization parameters by the method of conjugated pairs.

The following constants, for example, were obtained from these determinations:

| | | |
|---|---|---|
| Styrene/butyl acrylate | $r_S = 0.79$ | $r_B = 0.26$ |
| Styrene/acrylic acid | $r_S = 0.35$, | $r_A = 0.065$ |
| Butyl acrylate/acrylic acid | $r_B = 0.85$, | $r_A = 0.95$. |

To calculate the monomer distribution in terpolymers of these monomers, these parameters were inserted in the Alfrey-Goldfinger equation and the dependence of the terpolymer composition on the degree of conversion was calculated by means of a computer program for an intermittent batch reaction. The program is designed to reproduce both the integral and the differential composition of the terpolymer at the given point in time, i.e. after a given molar percentage conversion. By differential composition is meant the composition of that polymer which is formed at the given point in time (molar conversion) while the integral composition is the overall composition of the polymer which has been formed from the beginning of polymerization up to that point in time (molar conversion).

The accuracy of the calculations was confirmed experimentally on two different terpolymer mixtures by determining the integral composition of the resulting terpolymer analytically in dependence upon the degree of conversion and comparing the result with the calculations. The accuracy of the calculations was confirmed by the fact that the results of the calculations agreed with the experimental results within the limits of analytical error.

When the program had been tested in this way, it could be used to determine the monomer distribution of polymers obtained by methods other than the discontinuous bathwise method. Calculation of the polymer composition and monomer distribution in the polymer by means of the Alfrey-Goldfinger equation solved with computers has the advantage of affording a much more detailed insight into the composition of the polymer in dependence upon the method of production than could be obtained by chemical and physical analytical methods. The surprising finding of the investigations was that a product which is optimum in its flow properties could be obtained only by dividing the polymerization process into a preliminary polymerization in which the substance was continuously mixed (steady state) and a final polymerization (non-steady state) which was carried out continuously under conditions in which the substance at a later stage of polymerization did not mix with substance at an earlier stage in a plug flow tubular reactor.

All other methods of solvent-free polymerization or polymerization resembling solvent-free polymerization, such as bead polymerization, discontinuous solvent-free polymerization, not preceded by a stage of continuous steady state polymerization or polymerization comprising subsequent addition of individual monomers to a batch, etc. give rise to resins with substantially inferior flow properties.

The Alfrey-Goldfinger equation solved by computer program showed that when the monomer mixture of I, II, III and IV described above is subjected to a continuous steady state preliminary polymerization to a molar conversion rate of 35 to 60 % in a reaction vessel under conditions of ideal mixing and then further polymerized to a conversion rate of at least 94 mol % and preferably 98 mol % in a tubular plug flow reactor in which back mixing is substantially prevented, the resin obtained (a) does not contain any fraction with more than 55 mol % of the monomers of group I and (b) contains 5 to 20 mole % of fractions containing 30 up to 51 mol % of monomers of group IV and (c) contains 3 to 10 mol % of fractions containing 51 to 80 mol % of monomers of group IV. The differential portions (mol %) of monomers II and III do not have such a decisive influence on the properties of the polymer finally obtained.

The process according to the invention gives rise to a pulverizable resin which contains less than 6 % by weight of volatile constituents, generally less than 2 to 0.1 % by weight, and which does not form lumps even at room temperature, i.e. it is converted into a powder which remains freely pourable even at room temperature.

The process according to the invention can safely be carried out in large reaction vessels if the first stage of polymerization of the monomer mixture is carried out with the aid of an organic initiator which decomposes into radicals at temperatures below 100°C as described in U.S. Pat. No. 3,753,958 and the second stage is carried out with the aid of an initiator which decomposes into radicals more slowly at temperatures above 100°C.

The initiators which decompose at temperatures below 100°C should have a half life of less than 10 minutes at 100°C and those which decompose at 100°C to 170°C should have a half life of more than 10 minutes at 100°C.

This process enables polymerization to be kept constantly under control and at the same time enables almost complete conversion into polymer to be achieved so that the formation of lumps in the pulverized resins is prevented. If polymerization is carried out only with a rapidly decomposing initiator then complete conversion cannot be achieved because polymerization of the above mentioned monomer mixtures proceeds very slowly after about 70 % conversion. The initiator subsequently added is then inactivated too rapidly in proportion to the polymerization velocity. In order to achieve complete conversion with the aid of the rapidly decomposing initiator, it is necessary to use more than 1.0 % of initiator. To use more than 1.0 % of an initiator which decomposes at temperatures below 100°C is however, undesirable because the resulting substantial quantities of decomposition products are liable to soften the resin with the result that the resin forms lumps.

If, one the other hand, polymerization is carried out with the aid of an initiator which decomposes at temperatures of 100°C to 170°C, then polymerization is liable to become uncontrollable. Due to the slow rate of decomposition of the initiator, substantial quantities of unused initiator are liable to accumulate in the reaction mixture and then decompose suddenly in the event of a sudden rise in temperature due to insufficient conduction of heat, with the result that the reaction may then proceed explosively. If 70 % of the monomers have already polymerized, the molten polymer serves as diluent and heat conductor. The temperature employed depends on the viscosity of the molten lacquer and is 100°C to 150°C preferably 130°C to 140°C in the first stage and 130°C to 170°C, preferably 140 to 170°C, in the second stage.

After polymerization, volatile constituents may be removed continuously or discontinuously under vacuum. Removal of the volatile constituents may also be carried out by thin film evaporation.

The following rapidly decomposing peroxides are examples of the first group of initiators which decompose at temperatures below 100°C and may be used in the first stage of polymerization: tert-butylperpivalate, tert-butylperisobutyrate, tert.-butylperoctoate, benzoyl peroxide, monochloro- or dichloro-benzoyl peroxide, lauroyl peroxide, cyclohexanone hydroperoxide, percarbonates such as diisopropylperoxydicarbonate, cyclohexylperoxydicarbonate, diisooctylperoxydicarbonate, sulphonyl peroxides such as acetylcyclohexylsulphonyl peroxide, and acetylisopropylsulphonyl peroxide and nitrogen containing compounds such as azodiisobutyric acid dinitrile.

Di-tert.-butylperoxide, tert.-butylhydroperoxide, cumyl peroxide, methylethyl ketone peroxide, and tert.-butyl perbenzoate are typical examples of the many initiators which belong to the group of more slowly decomposing initiators used in the 2nd stage of polymerization of this invention.

Both groups of initiators are added to the reaction mixture in quantities of 0.1 to 1.0 % by weight each, based on the monomer mixture, in the course of polymerization. The total quantity of initiators used is 1 to 2 % by weight. The initiator which decomposes at lower temperatures must be added continuously during the whole of the first polymerization stage but the initiator which decomposes at higher temperatures may be added continuously or portionwise.

After termination of polymerization, the residual monomers, low boiling decomposition products of the initiators or molecular weight regulating agents may be distilled off in a stream of nitrogen or by applying a vacuum. The molten lacquer may be cooled on cooling sheets or rollers to form a vitreous resin or it may be applied directly from the melt.

When monomers of group I are polymerized on their own, they give rise to polymers with a high glass transition temperature of 70°C to 110°C. The monomers from group II are used for the incorporation of chemically reactive groups.

The monomers of Group III are film-forming substances which when polymerized on their own give rise to thermoplasts with glass transition temperatures of 80°C to −20°C. Monomers of Group IV serve to promote elastic resins and the homopolymers obtained from them are elastic products with glass transition temperatures of 14°C to −80°C.

The compounds used as copolymerizable monomers of Groups III and IV are esters of acrylic or methacrylic acid containing up to 8 and preferably 4 to 8 carbon atoms in the alcohol component which is preferably alkyl or cylcoalkyl. Typical examples of such compounds include ethyl acrylate, n-propyl or isopropyl acrylate, isobutyl acrylate, n-butyl acrylate, 2-ethylhexylacrylate, dodecylacrylate, octadecylacrylate, cyclohexylacrylate and the corresponding methacrylates. n-Butyl methacrylate (Group III) and n-butyl acrylate and/or 2-ethylhexylacrylate (Group IV are particularly preferred. The preferred monomers of Group I are styrene and/or methyl methacrylate.

The acid number of the polymer is determined by the proportion of acrylic or methacrylic acid, which is in the region of 10 to 25 mol %. The percent by weight of acrylic acid or methacrylic acid can be calculated from the acid number of the polymer and the molecular weight of the (meth)-acrylic acid as follows:

$$\frac{\text{Acid number} \times \text{molecular weight}}{560} = \text{percent by weight}$$

The molecular weights of the other components must then be known to convert the percentages by weight into molar percentages.

Additives which have the effect of reducing the molecular weight are optionally added in quantities of 0.1–5% by weight, based on the monomer mixture. n-Dodecyl and tert.-dodecyl mercaptan, cyclohexane and carbon tetrachloride are examples of such molecular weight regulating agents. Another important advantage of solvent-free polymerization compared with solution or dispersion polymerization is that more efficient use can be made of the capacity of the polymerization vessel. The volume/time yields are about 3 to 10 times higher than those obtained with solution polymerization. Yet another advantage of solvent-free polymerization is that the resins can be directly dissolved in any solvents which are capable to dissolving them whereas in the case of solution polymerization some solvents must be avoided either because they influence the molecular weight or because certain monomers are insoluble in them. Thus, for example, acetone is a poor solvent for use in solution polymerization because it is a powerful molecular weight regulator and owing to its high vapour pressure at normal pressure it does not permit polymerization temperatures above 60°C to be employed. Solvent-free acrylic resins, on the other hand, can be produced in any molecular weight at higher temperatures and then dissolved in acetone.

The acid resins obtained by the process according to the invention differ distinctly in their properties from those produced by the process according to U.S. Pat. No. 3,753,958. The binders claimed in this invention flow much more smoothly. Prepolymerization may be carried out in polymerization vessels measuring 1 to 1000 litres. The first stage can be carried out at normal pressure Part of the heat of polymerization may be used for heating up the monomer mixture which is introduced cold while another part can be removed by a reflux condenser by boiling the monomer mixture under reflux. In addition, heat can also be removed by the walls of the vessel. The usual stirrer constructions may be used for mixing, such as anchor agitators, impeller stirrers or stirring coils. The average residence time should be 15 to 30 minutes and the mixing time should be not more than 10 % of this. The polymerization temperature depends on the boiling point of the monomer mixture and is in the region of 100° to 140°C. The second stage of polymerization, in which back mixing with substance at an earlier stage of polymerization is substantially prevented, may be carried out in reaction screws or tubular reactors such as those described, for example, in British Patent Specification No. 1,034,449. The stirrers of the tubular reactors must be so designed that a plug flow is produced inside the tube. This can be achieved, for example, by using scrapers which scrape against the wall of the vessel or gate paddle agitators. Fixtures inside the tube ensure that no backwards mixing can take place. The mean residence times in the reaction tube or screw should correspond to those of a cascade of vessels of equal size comprising at least 6 perfectly agitated vessels in series. (compare Octave Levenspiel, Chemical Reaction Engineering, 2nd edition, John Wiley, New York, 1972). If desired, a discontinuously fed batch vessel may be used instead of the polymerization tube but in that case the whole quantity of prepolymer must be introduced at once and no monomers or monomer syrup may be added subsequently. Removal of heat is in this case must more complicated and moreover this discontinuous method of carrying out the second stage of the process is much less economical and technically very difficult to combine with the continuous prepolymerization stage.

The pulverizable resins obtained by the process according to the invention may be reacted or mixed with a reactive component. The reaction or mixing may be carried out simply by mixing the components at room temperature in a pulverulent state, by gasification in a fluidized bed or by mixing them in the molten state in a kneader, on rollers or in mixing screws. The melts are subsequently cooled, granulated or ground. The reactive components serve for the subsequent cross-linking reaction in the powder lacquering process. These reactive components are compounds which react with the carboxylic acid groups of the resins, for example N-methylol compounds, polyepoxides, blocked isocyanates, polyoxazolines or polyoxazines.

The copolymers according to the invention, which have melt viscosities of 50 to 400 poises at 180°C and 6900 dyn/cm$^2$ shear stress can easily be size reduced to granules of about 4 to 300 $\mu$ without clumping together and may then be used in this state for coating various materials by various methods of immersion coating or spray coating such as whirl sintering or flame spraying or by the electrostatic coating process.

The coatings are used primarily as corrosion protection or as protection against mechanical wear on articles made of metal such as steel, cast steel, copper, brass, bronze, red brass, aluminum and aluminium alloys as well as articles made of porcelain, ceramics, plastics and some types of wood. They may also be used as electrically insulating coatings in electrical engineering, e.g. for lamps, switches, parts of motors, etc. The whirl sintering process may be used, for example, for coating domestic utensils, refrigerator shelves, coat rails, towel holders, shelf units, display stands, decorative articles, shopping baskets, bottle holders, tubes, etc. The flame spraying process and electrostatic powder coating process are preferably used for coating larger surfaces of the materials mentioned above. These processes are employed, for example, for coating the outside and inside of tubes, containers, etc. The binders are advantageously used for spraying motor cars owing to their excellent flow properties. The percentages given in the Examples are percent by weight unless otherwise indicated.

EXPERIMENTS FOR COMPARISON

A monomer mixture of
48.00 parts by weight of styrene, 48.89 mol %
37.75 parts by weight of butyl acrylate, 31.24 mol %
14.25 parts by weight of acrylic acid, 19.86 mol %
1.5 parts by weight of tert.dodecylmercaptan
is introduced into a vessel equipped with stirrer coil under a stream of nitrogen and heated to 135°C in the presence of 0.5 parts by weight of hydroquinone monomethyl ether. 0.1 part by weight of tertiary butyl perpivalate is then introduced in the course of 22.5 minutes and the temperature is kept at 140°C. 1.0 part by weight of tert.-butyl peroctoate is introduced with stirring in the course of the next 30 minutes, during which time the temperature is raised to 160°C, and 0.5 parts by weight of ditert.-butyl peroxide are then added all at once. The temperature rises to 170°C. The molten lacquer is then stirred for a further 30 minutes and volatile constituents are removed under vacuum.

When a molar conversion of 5 percent had been reached, a sample was removed, precipitated with petroleum ether, extracted with chloroform and again precipitated. After drying the precipitate to constant weight, the acrylic acid content was determined by determining the acid number while the sum of butyl acrylate and acrylic acid was determined from oxygen analysis. The difference based on 100 indicated the styrene content. It was 56.3 mol % in this fraction. The butyl acrylate content was 24.7 mol % and the acrylic acid content 19 mol percent.

When the Alfrey-Goldfinger equation was solved by means of the parameters for styrene, acrylic acid and butyl acrylate given in the description, it was found that when this batch method was employed, 29 mol percent of the fractions formed at the beginning of polymerization contained more than 55 mol % of styrene.

100 g of the solidified lacquer melt which had an average molecular weight of 7600, an acid number of 106 and a glass transition temperature of 41°C determined by the needle impression method are mixed with 20 g of 1,4-phenylene bis-oxazoline, 50 g of titanium dioxide of the rutile type and 1.0 g of a syrupy copolymer of 70 parts by weight of ethyl hexyl acrylate and 30 parts by weight of ethyl acrylate with an average molecular weight of 5600 in a kneader at 100°C, and after solidification the mixture is ground to a particle size of 40 to 80 μ. The resulting powder is then electrostatically applied to degreased iron sheets to form a layer 70 μ in thickness which is then stoved at 160°C for 30 minutes. Although a very glossy, scratch resistant coating with a pencil hardness of 7H and Erichsen value of 7.5 mm and a gloss according to Gardner of 92° is obtained, the surface has a wavy structure resembling that of an enamelled surface which is unsuitable, for example, for spraying motor cars.

Another coated metal sheet used as sample is then stoved at 160°C for 4 minutes until the powder is completely sintered. The layer of film, which has not yet cross-linked, is rubbed smooth with grade 500 wet sanding paper and a smooth coating is then again stoved at 160°C for 30 minutes. This method is known in the trade as "Reflow lacquering". When the lacquer melts again, the marks formed by rubbing down the surface disappear and a film with high gloss and scratch resistance is obtained but the surface has again contracted to an enamel-like, uneven structure.

COMPARISON EXPERIMENT 2

This experiment shows that no fractions containing 51 to 80 mol % of monomers of Group IV are obtained if intensive backflow mixing occurs throughout the period of polymerization in a cascade of three kettles.

The mixture of monomer and molecular weight regulating agent described in comparison experiment 1 is polymerized in a continuous cascade apparatus consisting of three vessels with stirrer coils which cause vigorous back mixing. The velocity of flow is adjusted so that the time of stay in the first vessel is 22 minutes, in the second vessel 30 minutes and in the third vessel 30 minutes. The temperatures are 140°C in the first vessel, 160°C in the second vessel and 170°C in the third. 0.1 % by weight of tert.-butyl perpivalate is continuously added to the contents of the first vessel, 1.0 % by weight of tert.-butyl peroctoate is continuously added to the contents of the second vessel and 0.5 % by weight of di-tert.-butyl peroxides to the contents of the third vessel. The resin melt, which has a solids content of 94 % by weight, is degasified in a thin layer evaporator at 200°C and 30 mm Hg. The resin has an acid number of 104, an average molecular weight of 7500 and a glass transition temperature of 50°C.

A sample is removed from each vessel and precipitated with petroleum ether. Since stationary states and concentrations have become established after about 2 hours' operation in the vessel, the polymers formed in each vessel have a uniform, constant composition, i.e. the integral and differential composition are identical.

The samples were dissolved in chloroform, reprecipitated and dried to constant weight.

The proportion of acrylic acid is determined from the acid number. Oxygen analysis indicates the sum of oxygen content of acrylic acid and butyl acrylate. The butyl acrylate content in percent by weight can be calculated after subtraction of the acrylic acid content, which is already known. The difference between acrylic acid content and butyl acrylate content based on 100 is a measure of the styrene content. Percentages by weight are converted into molar percentages, and the differential composition is calculated from the integral composition, taking into account the degree of conversion. The following differential compositions of the polymers formed in the above mentioned vessels are obtained:

|  | Polymer from | | |
| --- | --- | --- | --- |
|  | Vessel 1 | Vessel 2 | Vessel 3 |
| Molar conversion in mol % | 49 | 75 | 98 |
| Mol % styrene | 53 | 50 | 39 |
| Mol % butyl acrylate | 27 | 31 | 44.5 |
| Mol % acrylic acid | 20 | 19 | 16.5 |

The polymer produced in this plant is composed of the three fractions indicated above. It therefore does not contain any components which contain more than 51 to 80 mol % of butyl acrylate. The values obtained agree with the values calculated from the Alfrey-Goldfinger equation.

Calculated differential compositions:

Vessel 1
(Molar conversion 50%),    26.1 mol % butyl acrylate,
                           52.85 mol % styrene
Vessel 2
(Molar conversion 74%),    31.6 mol % butyl acrylate,
                           50.13 mol % styrene
Vessel 3
(Molar conversion 98 %),   44.7 mol % butyl acrylate,
                           38.72 mol % styrene.

100 g of the resin are mixed with titanium dioxide, hardener and levelling agent as described in comparison experiment 1 and applied. The surface obtained after stoving at 160°C for 30 minutes is uneven and matt with a gloss according to Gardner of less than 40°.

COMPARISON EXPERIMENT 3

This experiment shows that a polymer which has a uniform composition has unsatisfactory technical properties for use as a lacquer.

A mixture of 355 g of styrene          37.05 mol %
125 g of acrylic acid     18.85 mol %
520 g of butyl acrylate   44.10 mol %
15 g of tert.-dodecylmercaptan is introduced into a 3-litre stirrer vessel equipped with stirring coil and heated to the reflux temperature (138°C).

A mixture of 20 g of tert.-butyl perpivalate
605 g of styrene          58.90 mol %
160 g of acrylic acid     22.51 mol %
235 g of butyl acrylate   18.59 mol %
15 g of tert.-dodecylmercaptan is then pumped into the mixture in the course of 90 minutes and the temperature is kept at 140° to 160°C. 10 g of di-tert.-butyl peroxide are then stirred in and the reaction mixture is then freed from volatile constituents at 170°C after 30 minutes stirring.

A total of
19.86 mol % of acrylic acid
31.24 mol % of butyl acrylate and
48.89 mol % of styrene was therefore polymerized. Samples were removed at intervals of 10 minutes during polymerization, dissolved in chloroform and precipitated with methanol. The samples were reprecipitated and dried to constant weight. The acid numbers of the samples were found to be constant within analytical limits of error at 104 to 108 and the oxygene content at 15.6 to 15.8 % by weight. This shows that the composition of the polymer formed remains constant over the whole period of polymerization. The polymer is therefrom uniform in structure. The glass transition temperature was 55°C, the acid number 106 and the average molecular weight 7500.

The resin was mixed with hardener, pigment and leveling agent as described in comparison example No. 1 and applied electrostatically.

The film obtained after stoving at 160°C for 30 minutes was uneven and matt and had an Erichsen cupping value of 1.5 mm.

EXAMPLE 1

Comparison Example No. 2 is repeated but instead of vessels 2 and 3, a reaction tube is used in which the ratio of height to length is 10 to 1 and in which the volume is calculated to result in an average residence time of 60 minutes. The reactor is equipped with a stirrer which sweeps over the wall of the vessel and rotates at 20 revs/min. The tube contains a fixed plug of wire mesh. The wall of the tube is temperature controlled in two sections so that the lower zone has a maximum temperature of 160°C and the upper zone a maximum temperature of 170°C. 1.0 % by weight of tert.-butyl peroctoate are continuously fed into the lower zone and 0.5 % by weight of di-tert.-butyl peroxide into the upper zone. Conversion is 98 mol %. The residence time spectrum was determined by means of injected xylene and gas chromatographic determination of the concentrations. The residence times correspond to those of a cascade of 10 vessels of equal size arranged in series.

The conversion rate in the continuously operated preliminary reactor was 49 mol % and the differential composition of the uniform polymer in the preliminary reactor 53 mol % of styrene, 27 mol % of butyl acrylate and 20 mol % of acrylic acid. According to the Alfrey-Goldfinger equation, 22 mol % of the fractions formed in the reaction tube in which no back mixing occurs contain 30 to 51 mol % of styrene while 7 mol % of the fractions contains 51 to 80 mol % of butyl acrylate.

The resin has an acid number of 105, an average molecular weight of 7600 and a glass transition temperature of 41°C. The resin was made up into a powder as described in comparison example 1 and applied. The sample stoved on the sheet metal at 160°C for 30 minutes has a smooth, level surface without any "enamel effect", a hardness of 7H and a gloss according to Gardner of 92°C. When reflow lacquering is employed, the surface remains smooth and free from the character of an enamel even after the second stoving, and the unevenness of the surface does not return.

EXAMPLE 2

The polymer from vessel No. 1 in comparison example No. 2 which has been converted to 49 mol % is cooled and isolated. This polymer syrup is introduced into a batch polymerization vessel and heated to 160°C, and 1.0 % by weight of tert.-butyl peroctoate are introduced with vigorous stirring, using a stirrer coil. After 30 minutes, the temperature is raised to 170°C and 0.5 % by weight of di-tert.-butyl peroxide is stirred in. After a further 30 minutes, the solids content was 98 % by weight.

According to calculation, this resin has practically the same composition as the resin from Example No. 1. The use technical properties and physical data were also identical with those of the resin from Example No. 1.

We claim:

1. A process for producing pulverizable acrylic resins which have an average molecular weight of 500 to 10,000, a glass transition temperature of 40° to 70°C and an acid number of 55 to 120 mg of KOH/g of resin, said process comprising preparing a solvent-free monomer mixture of

| | |
|---|---|
| I. | 0 to 55 mol % of styrene, α-methylstyrene, methylmethacrylate or mixtures thereof, |
| II. | 10 to 25 mol % of acrylic acid, methacrylic acid or mixtures thereof, |
| III. | 0 to 70 mol % of at least one ester of methacrylic acid containing 2 to 18 carbon atoms in the alcohol component and |
| IV. | 20 to 50 mol % of at least one ester of acrylic acid containing 1 to 18 carbon atoms in the alcohol component, | continuously feeding said mixture into a first polymerization zone, continuously polymerizing said mixture in said first zone under steady state and perfectly agitated conditions at temperatures from 100° to 150°C. in the presence of 0.1 to 1 percent by weight of an organic initiator which decomposes into free radicals at a temperature below 100°C. to a conversion of 35 to 60 mol %, continuously withdrawing polymerization reaction mixture from said first zone and then polymerizing withdrawn reaction mixture in a second polymerization zone (tubular plug flow reactor) at temperatures from 130° to 170°C. in the presence of 0.1 to 1 percent by weight of an organic initiator which decomposes into free radicals at a temperature above 100°C., said polymerization in said second zone (tubular plug flow reactor) being carried out to a conversion of at least 94 mol % and under non-steady state conditions which prevent back mixing of the polymer produced in said second polymerization zone with polymerization reaction mixture from said first polymerization zone and each said percent by weight being based on the weight of the monomer mixture.

2. The process of claim 1 wherein said polymerization reaction mixture is continuously withdrawn from said first polymerization zone at the same rate that said monomer mixture is introduced therein.

3. The process of claim 1 wherein said polymerization in said first polymerization zone under steady state and perfectly agitated conditions involves continuously feeding said monomer mixture to said first polymerization zone, mixing said monomer mixture with reaction mixture already in said polymerization zone within a time which is not more than one-tenth of the average residence time of the components of the reaction mixture in said polymerization zone and continuously removing polymerized reaction mixture from said zone at the same rate as said monomer mixture is supplied to said polymerization zone.

4. The process of claim 1 wherein said polymerization in said second polymerization zone (tubular plug flow reactor) under non-steady state conditions is carried out continuously by introducing withdrawn polymerization reaction mixture from said first zone while preventing back mixing of the polymer produced in said second polymerization zone (tubular plug flow reactor) with polymerization reaction mixture from said first polymerization zone.

5. The process of claim 1 wherein said polymerizing in said first polymerization zone is carried out at temperatures from 130° to 140°C and said polymerizing in said second polymerization zone is carried out at temperatures from 140° to 170°C.

6. The process of claim 1 wherein said polymerization in said first polymerization zone is carried out in the presence of 0.1 to 5 percent by weight, based on the weight of the monomer mixture, of a chain transfer agent.

7. The pulverizable acrylic resin produced by the process of claim 1.

8. The pulverizable acrylic resin of claim 7 wherein said monomer mixture consists of components I-IV.

9. The pulverizable acrylic resin of claim 7 wherein said monomer mixture consists of 40 to 55 mol % of component I, 10.0 to 25 mol % of component II and 25 to 35 mol % of component IV.

* * * * *